W. W. MILLER.
HARVESTER RAKE.

No. 104,483. Patented June 21, 1870.

Witnesses:
D. S. Mabee
Alex. H. Roberts

Inventor:
Wm. W. Miller
Per Munn & Co.
Attorneys

United States Patent Office.

WILLIAM WASHINGTON MILLER, OF ZIONSVILLE, INDIANA.

Letters Patent No. 104,483, dated June 21, 1870.

---

IMPROVEMENT IN HARVESTER-RAKES.

---

The Schedule referred to in these Letters Patent and making part of the same

---

*To all whom it may concern:*

Be it known that I, WILLIAM WASHINGTON MILLER, of Zionsville, in the county of Boone and State of Indiana, have invented a new and useful Improvement in Raking Attachment for Harvesters; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
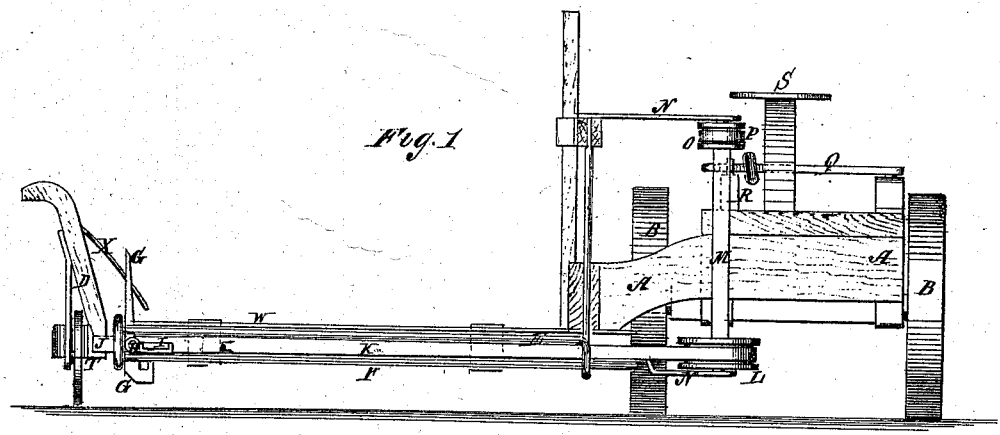
Figure 1 is a rear view of the frame-work of a harvester, to which my improvement has been attached.

My invention relates to improvement in the raking attachment of harvesters, and consists in the arrangement of parts, as hereinafter specified.

A represents the frame-work;

B, the drive-wheels;

C, the cutter-bar; and

D, the guard or separator of the harvester, about the construction of which parts there is nothing new.

The platform upon which the cut grain falls is formed of longitudinal bars, slats, or rods, E, which may be of any desired breadth.

F are rods, placed at a little distance below the bars or platform E, and the ends of which are securely connected with the said platform F, to form ways for the rake to slide back and forth upon.

The rake is formed by attaching fingers, G, to a rod, H, which works in a bearing attached to the bar I, which slides back and forth upon the ways or rods F.

The bases or lower ends of the fingers G are made heavy, to raise the said fingers into and hold them in an erect position when left free, and with a shoulder to rest against the under side of the bar or carriage I, to prevent them from being pushed back by the resistance of the grain while being swept from the platform E.

To the inner end of the bar or carriage I is attached, or upon it is formed, a T or cross-head, J, to one end or arm of which is attached the end of the strap or chain K, which passes along the rear edge of the cutter-bar C, and the other end of which is attached to the pulley or drum L, which is made with a flange upon its lower edge, or upon both edges, to keep the strap or chain in place upon it.

The pulley or drum L is attached to the lower end of a vertical shaft, M, the ends or journals of which work in bearings in the arms or brackets N attached to the frame-work A of the machine.

To the upper part of the shaft M is attached a small flanged pulley or drum, O, to which is attached and around which is wound a strap or chain, P, which may be passed around guide-pulleys, if necessary, and the other end of which is attached to the free end of the lever Q. The other end of the lever Q is pivoted to some suitable support attached to the frame-work A of the machine.

The free end of the lever Q, to which the strap F is attached, rests upon a slide, R, attached to the frame A, and which has a stop formed upon or attached to its inner end, to prevent the lever Q from being drawn too far back.

The lever Q may have a foot-rest attached to it, for the convenience of the driver in operating the said lever from his seat S.

To the other end or arm of the T or cross-head J is attached the end of the strap T, the other end of which is wound around and attached to a hollow drum, which revolves upon a small shaft rigidly attached to arms, brackets, or plats attached to the outer side of the guard or separator D.

Within the drum U is placed a coiled spring, V, one end of which is attached to the said drum, and its other end to the said shaft. The drum U is encased, to prevent its movements being clogged by the grain.

By this construction the rake is drawn forward, to sweep the grain from the platform, by operating the lever Q, which operation winds up the coiled spring V in the drum U, the uncoiling of which spring draws the rake back, ready to sweep off another gavel.

Figure 2:
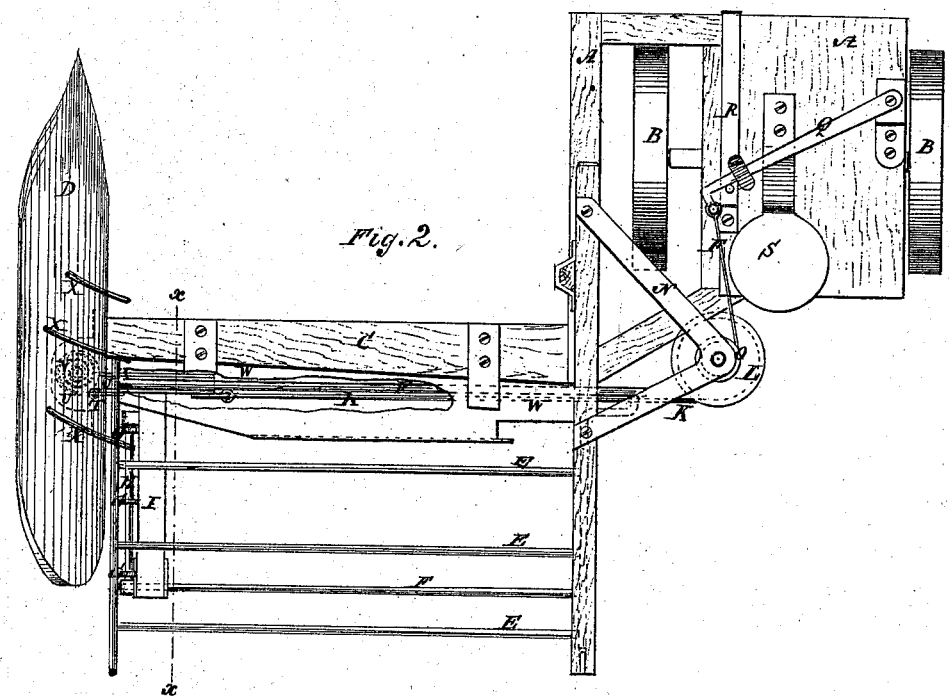
Figure 2 is a top view of the same, part being broken away to show the construction.
Figure 3:
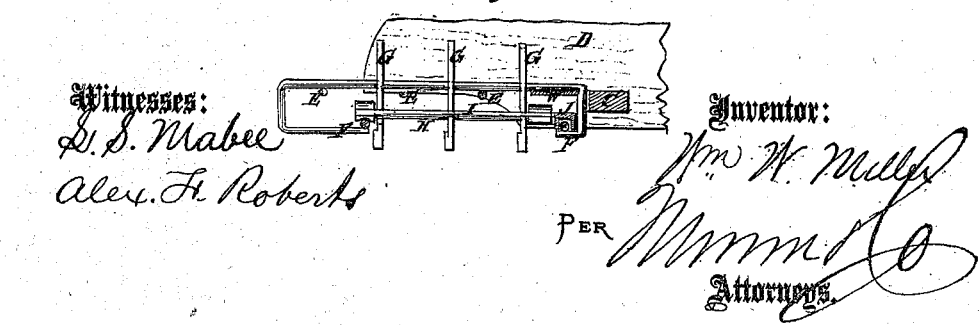
Figure 3 is a detail sectional view of the same, taken through the line x x, fig. 1.

W is a plate or box, one or more of which may be used, and which is attached to the rear edge of the cutter-bar C, or to the platform E. The rear edge of the plate or box W, at its outer end, is inclined, as shown in fig. 2, and upon said rear edge, near its other or inner end, is formed a notch or fork, as shown in fig. 2.

By this construction, as the rake is drawn inward to sweep the grain from the platform, the tooth of the rake slides along the inclined rear edge of the plate or box W, and is thus moved slightly to the rearward. As the rake is drawn back after discharging the gavel, the tooth strikes the notch or fork of the plate W, and the teeth are turned down into and held in a horizontal position while moving back, so as to pass beneath the grain falling upon the platform.

X are fingers or guide-rods, attached to the inner side of the guard D, to prevent any grain from falling in the rear of the rake.

Having thus described my invention,

I claim as new and desire to secure by Letters Patent—

The arrangement, with the platform A, of plate W, rods E F, rake G H I, bands K F, spring V, shaft M, and lever Q, substantially as shown and described.

WILLIAM WASHINGTON MILLER.

Witnesses:
RATLIFF BAIRD,
JAMES MILLER.